US012722261B2

(12) United States Patent
Landolt

(10) Patent No.: US 12,722,261 B2
(45) Date of Patent: Sep. 1, 2026

(54) TOOL FOR DRIVING A CHAIN PIN OUT OF A CHAIN LINK

(71) Applicant: DAYSAVER AG, Zürich (CH)

(72) Inventor: Daniel Landolt, Birmensdorf (CH)

(73) Assignee: DAYSAVER AG, Zürich (CH)

( * ) Notice: Subject to any disclaimer, the term of this patent is extended or adjusted under 35 U.S.C. 154(b) by 348 days.

(21) Appl. No.: 18/564,027

(22) PCT Filed: Jun. 18, 2022

(86) PCT No.: PCT/EP2022/066639
§ 371 (c)(1),
(2) Date: Nov. 24, 2023

(87) PCT Pub. No.: WO2023/016684
PCT Pub. Date: Feb. 16, 2023

(65) Prior Publication Data
US 2025/0042009 A1 Feb. 6, 2025

(30) Foreign Application Priority Data
Aug. 7, 2021 (DE) ..................... 10 2021 120 579.4

(51) Int. Cl.
*B25B 27/00* (2006.01)
*B21L 21/00* (2006.01)

(52) U.S. Cl.
CPC .......... *B25B 27/0071* (2013.01); *B21L 21/00* (2013.01)

(58) Field of Classification Search
CPC ............................. B21L 21/00; B25B 27/0071
(Continued)

(56) References Cited

U.S. PATENT DOCUMENTS 1,335,092 A * 3/1920 Conley ............... B25B 27/0071
81/DIG. 7
6,286,168 B1 9/2001 Woodruff et al.
(Continued)

FOREIGN PATENT DOCUMENTS

DE 297 05 818 U1 5/1997
GB 2533545 A 6/2016
TW 201325766 A * 7/2013

OTHER PUBLICATIONS

International Search Report (PCT/ISA/210), issued in PCT/EP2022/066639, dated Oct. 18, 2022.

*Primary Examiner* — Katina N. Henson
(74) *Attorney, Agent, or Firm* — Birch, Stewart, Kolasch & Birch, LLP

(57) ABSTRACT

A tool for driving a chain pin out of a chain link includes a handle body which extends along a longitudinal axis and has a positioning element at a first end along the longitudinal axis, and a press-out device with an upper and a lower projection, which in each case delimit an intermediate element connecting the two projections, wherein through holes coaxial with one another are provided in the two projections and a driving screw with a press plunger is screwed into the upper projection at its end oriented towards the lower projection. This tool is intended to have good manual applicability, even for chains of different types, while at the same time having very small dimensions and being easy to transport, and in particular to enable machining of very narrowly constructed chain types. This is achieved by the fact that the handle body has, at the first end along the longitudinal axis, a guide device extending the handle body, in which guide device the press-out device is mounted so as to be movable along the longitudinal axis of the handle body between a first position in which the positioning element and the intermediate element of the
(Continued)

Figure 1:
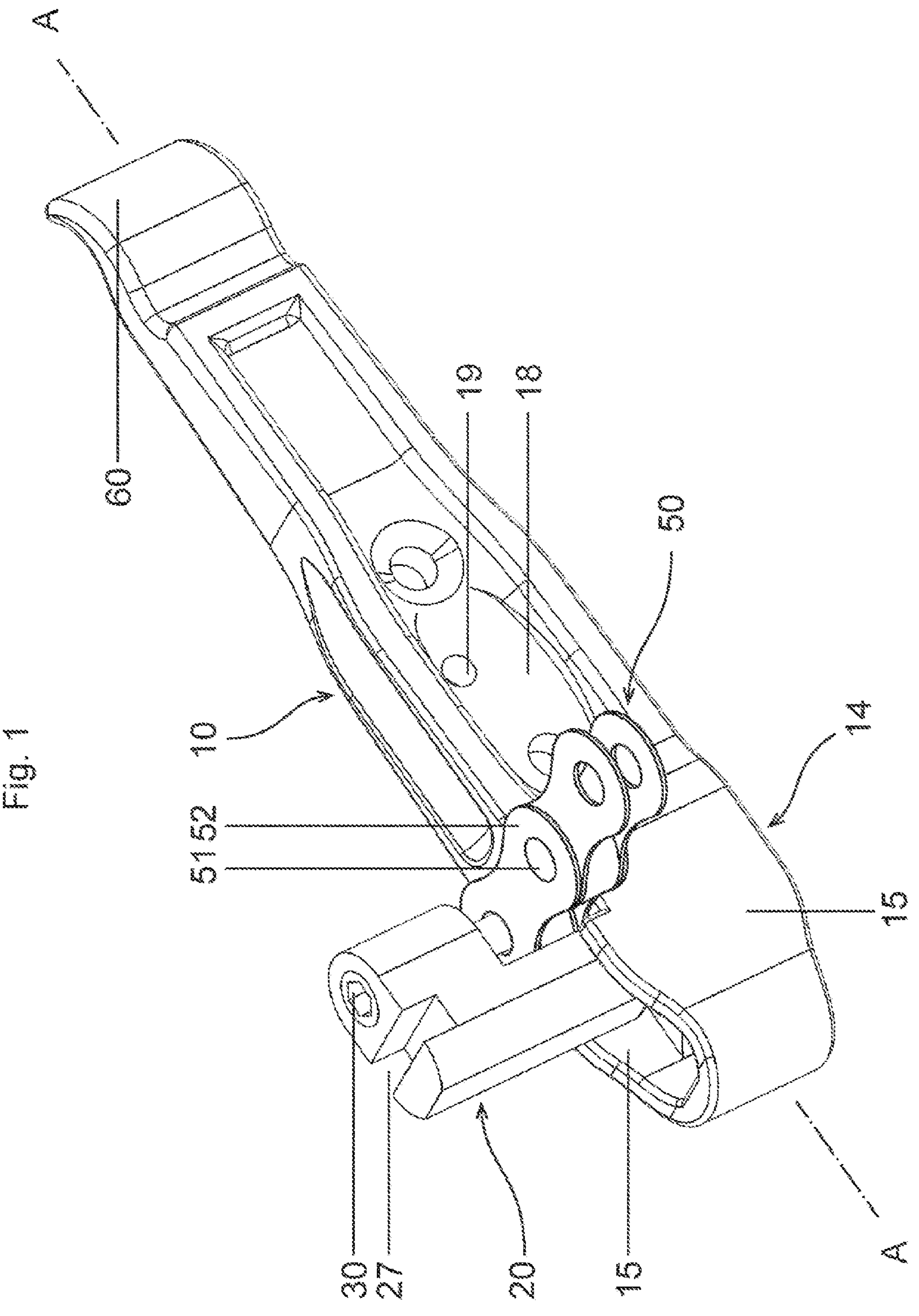

press-out device form a chain space for positioning the chain link, and a second position in which the press-out device is spaced from the positioning element.

12 Claims, 6 Drawing Sheets

(58) Field of Classification Search
USPC .............................................................. 7/138
See application file for complete search history.

(56) References Cited

U.S. PATENT DOCUMENTS

| | | | | |
|---|---|---|---|---|
| 10,408,301 | B2 | 9/2019 | Lauer | |
| 2019/0077002 | A1* | 3/2019 | Tsai | B25F 5/001 |

* cited by examiner

TOOL FOR DRIVING A CHAIN PIN OUT OF A CHAIN LINK

The invention relates to a tool for driving a chain pin out of a chain link, comprising a handle body extending along a longitudinal axis and having a positioning element at a first end along the longitudinal axis, and a press-out device having an upper and a lower projection, which in each case delimit an intermediate element connecting the two projections, wherein through holes coaxial with one another are provided in the two projections, and a driving screw with a press plunger is screwed into the upper projection at its end oriented towards the lower projection.

Such tools are used for repairs of defective chain links or for shortening of drive chains. For this purpose, the chain links, which are hinged together by means of a chain pin, often have to be detached from each other. This is done by driving out the chain pin by means of a press plunger engaging the chain pin in a coaxial direction in the longitudinal axis of the chain pin. The term “chain rivet” is often used as a synonym for “chain pin”. However, this is misleading and technically incorrect in most cases, since not all chain designs actually have the links riveted together, but are often only connected to each other by means of connecting pins that are exclusively friction-locked. Especially for cyclists, such a tool is of great importance for the repair of defects in the drive chain of the bicycle, such as a broken chain link. Accordingly, a large number of tools of this type are known from the prior art, for example from DE 297 05 818 U1. The “Revolver” riveting tool from Fa. Rohloff is also very well known in specialist circles. In this tool, the lower projection of the press-out device is replaced by a rotationally adjustable drum. In this way, through holes with different diameters can be positioned in the working area below the press plunger, which enables more precise machining of chains of different types and manufacturers. However, all these known tools have in common that they are more suitable for use in stationary workshops due to their large dimensions and the resulting bulkiness and the packing volume required by these tools and are only very poorly suited for taking along on a bicycle tour. Sporty riders in particular therefore tend to use space-saving and weight-saving so-called “multitools”, in which a number of different tools that can be used to repair typical damage to bicycles are combined in a minimalist design to save space in a small case or are attached to a common base element so that they can be folded and/or swiveled. However, such known multitools often contain only highly miniaturized embodiments of the aforementioned known tools. Their usability is very limited, since these miniature tools often cannot be aligned exactly with the chain pin to be driven out and sometimes also cannot apply the drive-out forces required to drive them out. Furthermore, all tools of the type known in the prior art have in common that a chain link to be machined is placed on a comb-like positioning element which engages in the intermediate space between the two outer plates of the chain link. However, there is a strong trend in modern chain construction to reduce the distance between the opposing outer plates of a chain link in order to reduce the component depth of gearshift cassettes despite a large number of gears or sprockets. The intermediate spaces between the outer plates of a chain link thus become narrower and narrower. This means that some such chains of narrow design can no longer be machined with the known tools, because the comb-like positioning elements must not fall below a certain minimum thickness and can therefore no longer engage in the chain links of some chain designs.

The object of the present invention is thus to provide a tool for driving a chain pin out of a chain link, comprising a handle body which extends along a longitudinal axis and has a positioning element at a first end along the longitudinal axis, and a press-out device having an upper and a lower projection, each of which delimits an intermediate element connecting the two projections, wherein through bores coaxial with one another are provided in the two projections and a driving screw with a press plunger is screwed into the upper projection at its end oriented towards the lower projection, which is to combine a good manual applicability also for chains of different types with at the same time very small dimensions and good transportability. In particular, the tool should also enable the machining of very narrowly designed chain types.

This object is solved in that the handle body has, at the first end along the longitudinal axis, a guide device extending the handle body along the longitudinal axis, in which the press-out device is mounted so as to be displaceable along the longitudinal axis of the handle body between a first position, in which the positioning element and the intermediate element of the press-out device form a chain space for positioning the chain link, and a second position, in which the press-out device is spaced from the positioning element. In this way, the press-out device can be displaced or adjusted between a designated position of use, in which the chain link positioned in the chain space is positively and/or non-positively fixed, and a out-of-use position, in which this fixing is removed and the space required for insertion, alignment and manual manipulation of the chain link in the tool by the operator is significantly increased and is more accessible to the operator.

In a preferred manner in this context, the press-out device can be removed from the guide device while being in the second position, for example by moving it along a spatial axis that is aligned perpendicular to the direction of displacement of the press-out device in the guide device. In this way, the press-out device and the handle body are separable, allowing separate storage of both components of the tool. This is particularly advantageous since both components, when assembled for the intended use, each have elongations which are arranged at right angles to one another and therefore the tool occupies a comparatively large volume of space when assembled. This is known to be troublesome when storing a generic tool according to the prior art. The invention now makes it possible-in addition to the aforementioned improvement in the handling of the tool-to store the tool in a state in which the press-out device and handle body can be separated from one another and positioned in a space-saving manner, for example in a mutually parallel arrangement.

Here, the invention provides that the press-out device can be fixed in the first position against the handle body by magnetic means. This enables the user to fix the press-out device against the handle body in a simple manner, wherein the press-out device is pressed quasi automatically in the direction of the handle body and thus also against the positioning element arranged on the handle body by the effective force of the magnetic means. In this way, automatic fixing of the chain link positioned in the chain space is made possible by the clamping acting on the chain link from the press-out device. This facilitates the operation of the tool according to the invention, since the operator does not have to perform any separate operating actions for fixing the chain link in the chain space and can thus concentrate exclusively on the correct positioning of the chain link in the chain space—in particular on the exact alignment of the chain pin to be driven out in coaxial extension of the feed movement of the press plunger of the press-out device.

According to a particularly preferred further development of the inventive basic idea, the handle body forms a recess at the first end along the longitudinal axis which extends the handle body in the longitudinal axis and is bounded by side walls, wherein the guide device is integrated in the side walls. The side walls are aligned parallel to the longitudinal axis of the tool or handle body and have linear guide elements, such as guide webs or the like, on their facing inner surfaces. To ensure its displaceability between first and second positions in the area of the side surfaces delimiting the lower projection, the press-out device has counterparts corresponding functionally with these linear guide elements, such as a linear groove on both outer sides of the lower projection. Such integration into a recess recessed in the tool makes it possible to achieve a high degree of stability of the tool according to the invention. The side walls of the recess can be dimensioned to be break-resistant and can be designed completely smooth or flat towards the outside, so that the tool does not get stuck anywhere during use. With regard to the removability of the press-out device from the guide device, it is of particular importance that the guide device extends in the longitudinal axis of the tool or of the handle body only over a partial region of each side wall of the recess and is thus absent in a region of the recess remote from the positioning element. The gap formed in this way is dimensioned in such a way that the press-out device is not in engagement with the guide device in this area and can therefore be removed from it.

With regard to the basic concept of the invention, it is particularly advantageous if the positioning element has a semicircular recess and is molded onto the handle body in such a way that an edge is formed between the positioning element and the handle body, which limits a support surface for a chain link positioned in the chain space towards the handle body. The semicircular recess forms a substantially vertical side surface on the positioning element that is oriented toward the chain space and, in turn, forms the aforementioned edge with the handle body that delimits the support surface. The dimensioning of the semicircular recess corresponds to the radius of the outer contour of an outer plate of the chain links provided for machining by means of the tool according to the invention. Thus, a contact takes place between an outer plate of the chain link and the positioning element. This represents a departure from conventional positioning elements known from the prior art, which are always designed as a comb engaging in the intermediate space between the two outer plates of a chain link and rest directly on the chain pin itself to be driven out. The support surface is part of the handle body and is oriented at right angles to the direction of the feed movement of the press plunger of the press-out device. Thus, the chain link positioned in the chain space is not only effectively supported in the vertical direction against the handle body against the forces exerted on the chain link by the press plunger during the expulsion of the chain pin, with the lower outer plate of the chain link resting fully flat on the support surface, but at the same time it is also positioned in the horizontal direction by the outer plate resting against the edge or the side surface of the positioning element oriented towards the chain space. The chain link can be introduced into the chain space independently of the positioning of the press-out device, i.e. in particular also when the press-out device is in the second position, and positioned on the support surface by manual contact against the edge or the side surface of the positioning element. As soon as the press-out device is positioned in the first position, the intermediate element of the press-out device clamps the chain link against the positioning element.

It is particularly advantageous if the upper edges of the guide device or the side walls of the recess adjoin the handle body in such a way that they extend the support surface. In this way, the support of the chain link positioned in the chain space is significantly improved in the vertical direction, i.e., in the direction of the feed movement of the press plunger.

The invention further provides that a hook- or lever-like tire engagement element of a tire lifter is formed on the second end of the handle body remote from the guide means. In this way, the comparatively sturdily constructed handle body can be made usable for another tool. This opens up the possibility of realizing a combination tool that is useful for cyclists.

A useful embodiment of the invention further provides that a recess is formed in a region between the first end and the second end of the handle body, the boundary contour of which as well as its recess in relation to the surface of the handle body correspond to the outer contour as well as the component thickness of a chain lock or replacement chain link. In this way, a chain lock or replacement chain link can be stored on the handle body in a space-saving manner. In addition, a magnet is provided at the bottom of the recess to serve as a holding means for the replacement chain link. In addition or as an alternative, means can be provided in the area of the recess for positive retention of the chain lock or replacement chain link by means of clamping.

According to a further useful embodiment of the invention idea, at least one element for gripping a tire valve is formed in the side of one of the two projections of the press-out device facing away from the intermediate space, for example in the manner of an opening whose inner diameter corresponds to the outer diameter of a tire valve and is provided with additional elements for positive or non-positive gripping of the tire valve. In this way, the press-out device can be made useable for another tool that is very useful for cyclists, effectively supporting the concept of a combination tool. In a manner analogous to this, it is further provided that at least one nipple tensioner is formed in the side of one of the two projections of the press-out device facing away from the intermediate space. If the press-out device is implemented on a first side with the aforementioned element for gripping the tire valve, the nipple tensioner is sensibly implemented on the opposite side of the press-out device to this.

The present invention is explained in more detail below with reference to an embodiment example and associated drawings. Showing:

FIG. 1: a perspective view of the tool according to the invention

Figure 2:
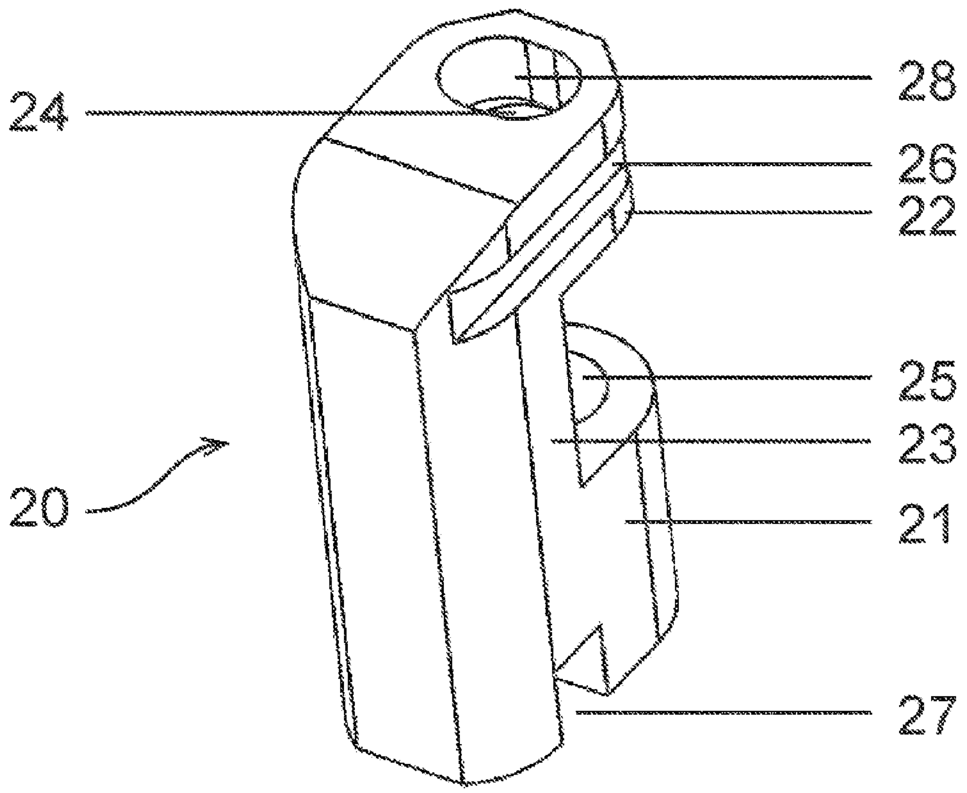

FIG. 2: a single view of the press-out device, direction of view from below

Figure 3:
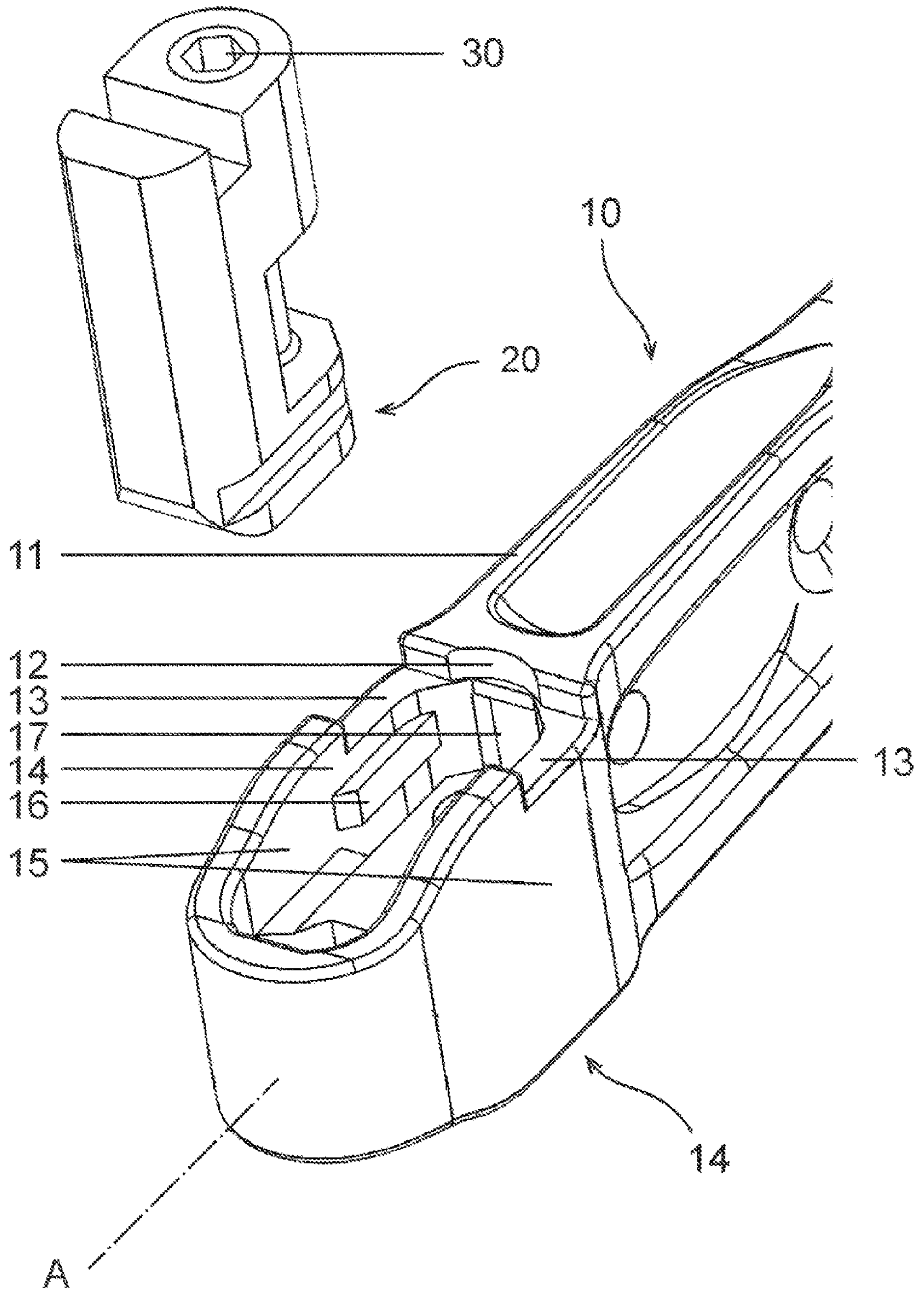
Figure 4:
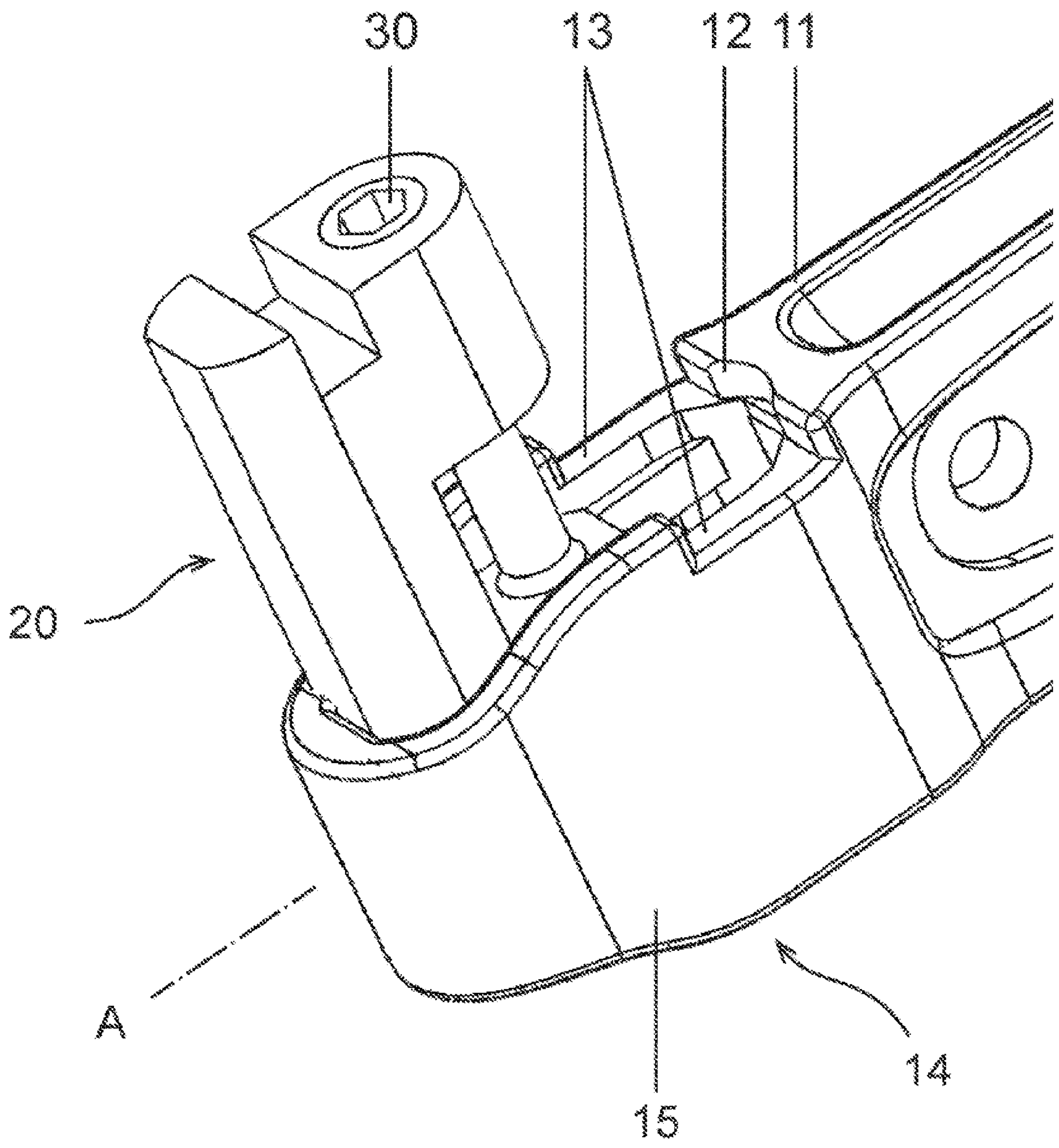
Figure 5:
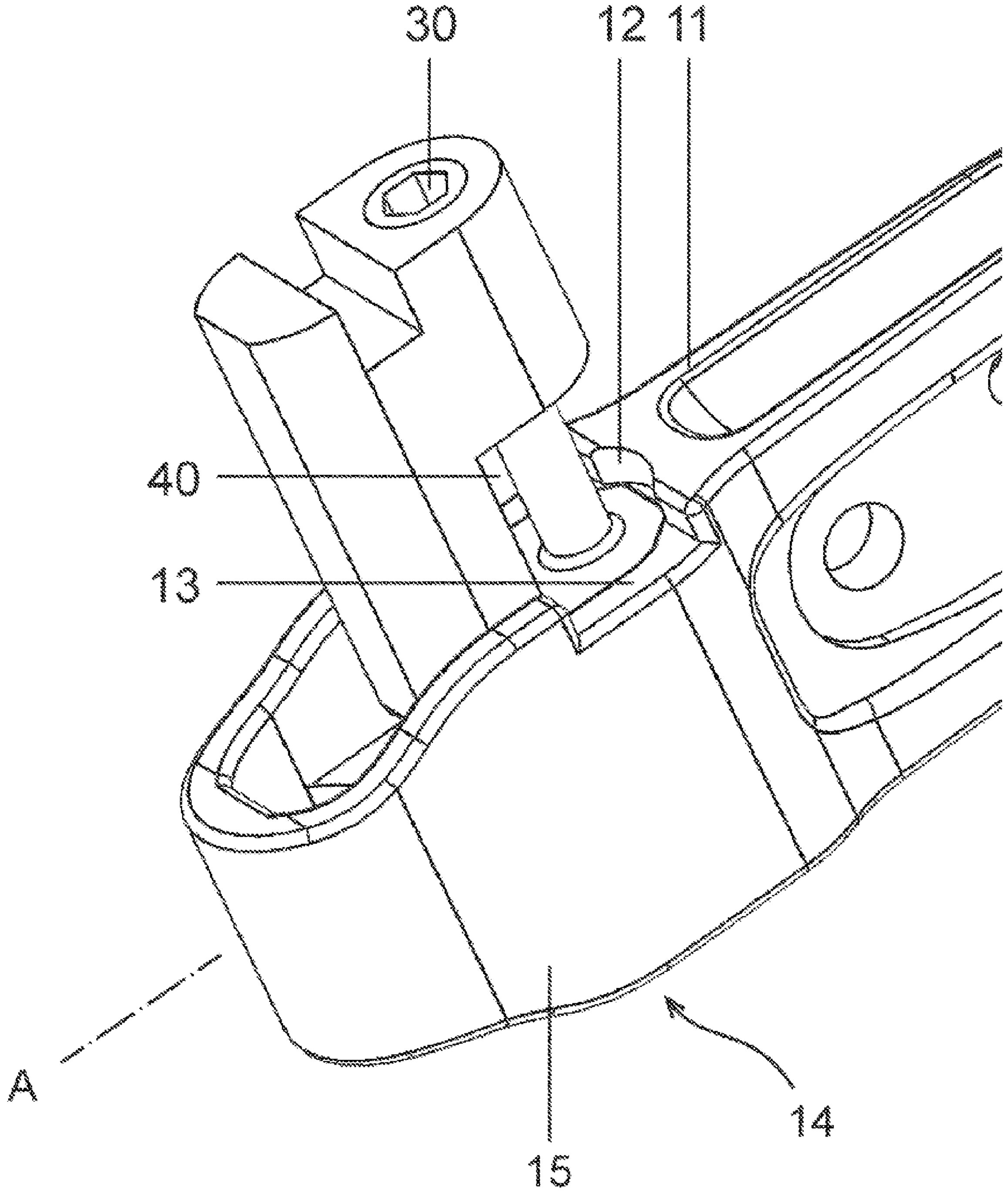
Figure 6:
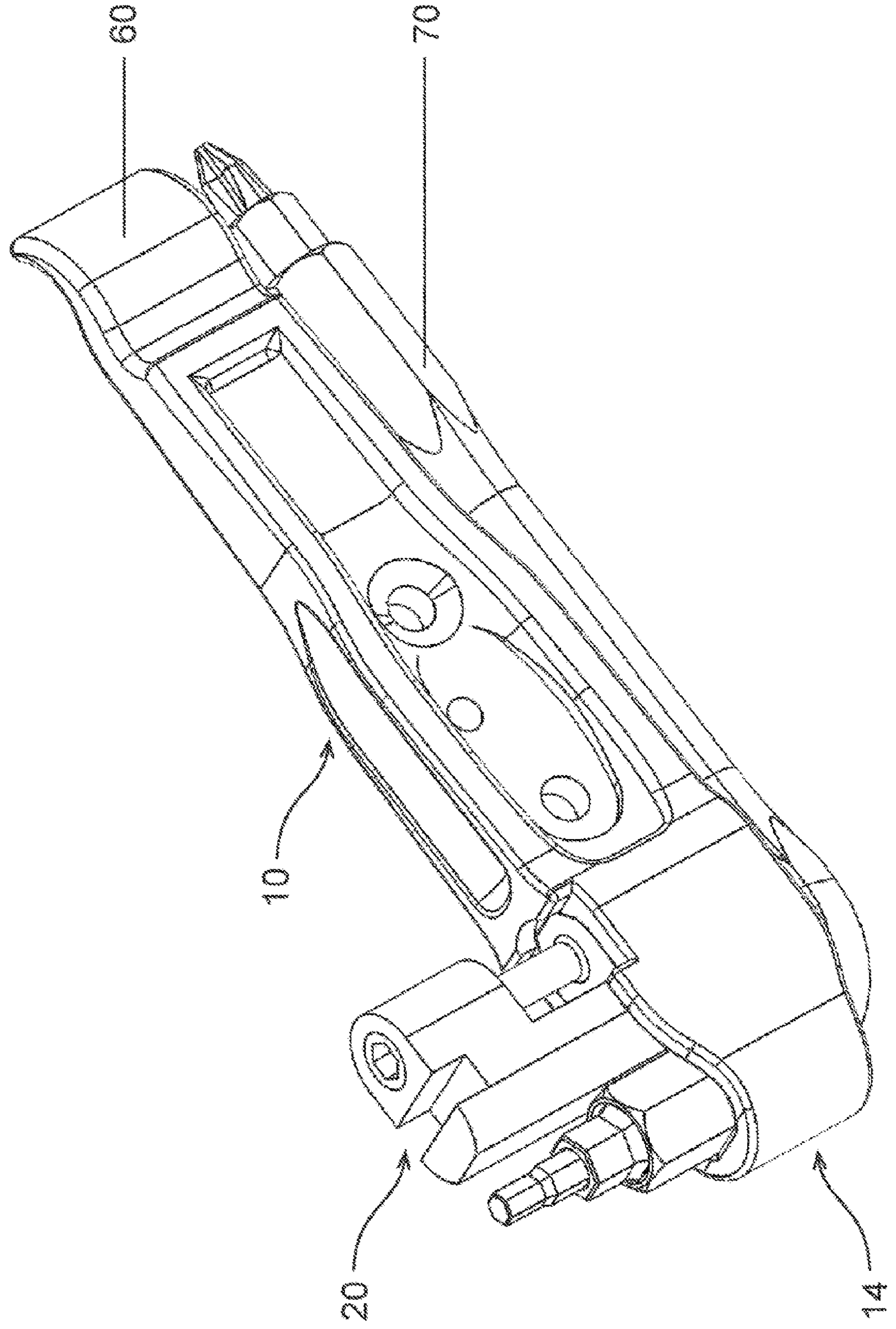

FIG. 3: a detailed view of the press-out device in a position separated from the handle body FIG. 4: a detailed view of the press-out device in second position FIG. 5: a detailed view of the press-out device in a first position FIG. 6: a view of the tool according to the invention in combination with an additional tool with hexagonal outer contour The tool according to the invention consists of a handle body (10), in the present case in the form of a solid square made of glass-fiber-reinforced plastic, as well as a press-out device (20) and a driving screw (30), in the present case both made of metal. The press-out device (20) is formed in a manner known per se from the prior art with an upper projection (21), a lower projection (22) and an intermediate element (23) arranged between these two projections and delimited by them. Through holes (24, 25) coaxial with each other are provided in the two projections (21, 22); the intermediate element (23) is narrower and not affected by these through holes (24, 25). In a manner also known from the prior art, a driving screw (30) is screwed into the through hole (24) of the upper projection (21), the press plunger of which (not visible in the figures for reasons of the selected perspective) is oriented in the direction of the lower projection (22). At a first end along the longitudinal axis (A) of the handle body (10), the handle body (10) has a positioning element (11) which has a semicircular recess (12) on a lateral surface. Furthermore, a guide device (14) is formed on the first end along the longitudinal axis (A) of the handle body (10), which extends the handle body (10) by means of side walls (15) parallel to the longitudinal axis (A).

A guide strip (16), which is also parallel to the longitudinal axis (A), is arranged on the opposite inner sides of each side wall (15). A guide groove (26) is incorporated on both sides of the lower projection (22) of the press-out device (20), in each of which a guide strip (16) of the guide device (14) of the handle body (10) can engage. The guide strips (16) are shorter than the side walls (15) in relation to the longitudinal axis (A). This creates a gap in which the press-out device (20) is not guided in the guide device (14). As shown in FIG. 2, the press-out device (20) can be separated from the guide device (14) or from the handle body (10) while being positioned in the region of this guide hatch. Thus, the press-out device (20) can be inserted into or removed from the handle body (10) in this position.

The positioning element (11) is applied to a surface of the handle body (10) in such a way that, on the one hand, its side surface designed as a semicircular recess (12) is oriented in the direction of the guide device (14) and, on the other hand, this aforementioned side surface forms an edge with the surface of the handle body, which edge delimits a support surface (13) of the handle body located in front and in the direction of the guide device. This support surface (13) also includes the upper edges of the side walls (15) and thus also extends to the guide device (14). Provided that the press-out device (20) is in engagement with the guide device (14), the inner upper side of the lower projection (22) of the press-out device (20), which is oriented in the direction of the intermediate element (23), does not have a height offset with respect to the support surface (13). Furthermore, the handle body has a magnet (17) below the positioning element, which also acts in the direction of the guide device (14).

As shown in FIGS. 4 and 5, the press-out device (20) inserted into the handle body (10) is mounted for displacement between a first position (shown in FIG. 5) and a second position (shown in FIG. 4) by means of the guide device (14). The first position of the press-out device (20) shown in FIG. 5 represents the position of use, in which the tool according to the invention is ready for use for driving a chain pin (51) out of a chain link (50). In this position, the positioning element (11), the intermediate element (23) and the lower projection (22) of the press-out device (20) as well as the support surface (13) define the chain space (40) provided for positioning the chain link (50) to be machined, wherein the lower projection (22) and the support surface (13) form a continuous flat surface. The press-out device (20) is fixed in this position against the handle body (10) by means of the magnet (17).

When the tool is used as intended, the press-out device (20) is inserted into the handle body (10) and positioned in the first position shown in FIG. 5 with respect to the handle body (10). In a first step, the chain link (50) to be machined by means of the tool is introduced into the chain space (40), placed on the support surface (13) by means of a first vertical movement component with the outer plate (52) oriented downwards and pushed in the horizontal direction against the side surface of the positioning element (11). This acts as a stop, wherein the contour of the outer plate (14) aligns with the contour of the semicircular recess (12). In this way, the chain link is reliably positioned in relation to the tool in such a way that its chain pin (51) to be driven out is aligned in coaxial extension of the feed direction of the driving screw (30) or its press plunger. This is an essential prerequisite for the successful and proper expulsion of the chain pin. In the further course of the intended use of the tool, the press plunger is first lowered by turning the driving screw (30) towards the chain pin (51), which is then finally expelled from the chain link (50) by the press plunger.

For transport and space-saving storage of the tool, the press-out device (20) can be moved by means of the guide device (13) into the second position shown in FIG. 4, in which the press-out device is spaced as far as possible from the positioning element (11). For this purpose, only the holding force of the magnet (17) must be overcome. Since the guide grooves (26) of the press-out device (20) and the guide strips (16) of the handle body (10) are no longer in mutual engagement in this position, the press-out device (20) can be removed from the guide device (14) in this position and thus separated from the handle body (10). Thus, the tool does not have to be stored and transported in the bulky position of use.

In the central region of the handle body (10), i.e., in a region between its first and second ends, a recess (18) is formed which is offset by approximately 90° relative to the positioning element (11) and whose boundary contour corresponds approximately to the contour of the outer plate (52) of a chain lock and whose recess relative to the surface of the handle body (10) corresponds approximately to the component thickness of a chain lock. This recess (18) is thus provided for stocking a chain lock, which serves as an aid for reconnecting a chain after removing a defective chain link. A magnet (19) is integrated at the bottom of the recess (18), by means of which a chain lock can be securely fixed to the handle body (10). In a preferred manner, two such recesses (18) are provided on opposite sides of the handle body (10).

Beyond this first function of driving a chain pin out of a chain link, the tool shown here can be used for a plurality of other applications. Thus, the tool first has a hook-like or lever-like tire engagement element (60) at the second end of the handle body (10) remote from the guide device (14), so that the tool can additionally be used as a tire lever. Furthermore, a tire valve gripper (28) is integrated in the lower side of the lower projection (22) of the press-out device (20) facing away from the intermediate element (23), and a nipple tensioner (27) is integrated on the opposite upper side of the upper projection (21) of the press-out device (20). Such nipple tensioners are used to tighten or loosen sleeve nuts, by means of which the spokes are fixed in the rim flange of a wheel. It is true that the aforementioned tools do not have any direct functional reference to the driving out of chain pins as the original function of the tool. However, they represent useful functional extensions and broaden the range of applications of the tool according to the invention.

A further functional extension of the tool is given by the fact that a recess with a hexagonal outer contour is provided in the bottom region of the guide device (14) of the handle body (10). An additional tool (70) with a similar hexagonal external contour, such as a hexagon socket or a compact socket set already marketed by the applicant under the designation “daysaver”, which reproduces the external contour of such a hexagon socket, can be passed through the latter and is held in a form-fitting manner against the handle body by means of form elements. In combination with such an additional tool, the press-out device (10) remains in engagement with the guide device (14) of the handle body (10) and forms a design unit with the short lever end of the additional tool (70). To improve the form fit, the outer surface of the press-out device contacting the aforementioned tool (70) is adapted to the outer contour of the tool (70) in this area. Likewise, the length of the aforementioned short lever end is consistent with the overall height of the press-out device (20) engaged in the guide device (14).

LIST OF REFERENCE NUMERALS

10 Handle body
11 Positioning element
12 Semicircular recess
13 Support surface
14 Guide device
15 Side wall
16 Guide strip
17 Magnet
18 Recess
19 Magnet
20 Press-out device
21 Upper projection
22 Lower projection
23 Intermediate element
24,25 Through holes
26 Guide groove
27 Nipple tensioner
28 Tire valve gripper
30 Driving screw
40 Chain space
50 Chain link
51 Chain pin
52 Outer plate
60 Tire engagement element
70 Tool with hexagonal external contour
A Longitudinal axis of the handle body

The invention claimed is:

1. A tool for driving a chain pin out of a chain link, comprising: a handle body which extends along a longitudinal axis and has a positioning element at a first end along the longitudinal axis; and a press-out device having an upper and a lower projection, each of the upper and lower projections delimiting an intermediate element connecting the upper and lower projections, wherein through bores coaxial with one another are provided in the upper and lower projections and a driving screw with a press plunger is screwed into the upper projection at an end thereof oriented towards the lower projection, wherein the handle body has, at the first end along the longitudinal axis, a guide device extending the handle body along the longitudinal axis, in which the press-out device is movably mounted along the longitudinal axis of the handle body between a first position, in which the positioning element and the intermediate element of the press-out device form a chain space for positioning the chain link, and a second position, in which the press-out device is spaced apart from the positioning element, wherein the guide device comprises a recess, and wherein the press-out device fits within the recess, wherein the recess has a guide strip and the press-out device has guide groove mating with the guide strip.

2. The tool for driving out the chain pin according to claim 1, wherein the press-out device can be fixed in the first position against the handle body by a magnet.

3. The tool for driving out the chain pin according to claim 1, wherein the handle body forms, at the first end along the longitudinal axis, a recess which lengthens the handle body in a direction of the longitudinal axis and is delimited by side walls, wherein the guide device is integrated into the side walls.

4. The tool for driving out the chain pin according to claim 1, wherein the positioning element has a semicircular recess and is formed on the handle body in such a way that an edge is formed between the positioning element and the handle body, the edge delimiting a support surface for a chain link positioned in the chain space towards the handle body.

5. The tool for driving out the chain pin according to claim 1, wherein a hook or lever tire engagement element of a tire lifter is formed on a second end of the handle body remote from the guide device.

6. The tool for driving out the chain pin according to claim 1, wherein a recess is formed in a region between the first end and a second end of the handle body, a boundary contour of the handle body as well as a recess thereof in relation to a surface of the handle body correspond to an outer contour as well as a component thickness of a chain lock or replacement chain link.

7. The tool for driving out the chain pin according to claim 1, wherein at least one element for gripping a tire valve is formed in a side of one of the upper and lower projections of the press-out device facing away from the intermediate element.

8. The tool for driving out the chain pin according to claim 1, wherein at least one nipple tensioner is formed in a side of one of the upper and lower projections of the press-out device facing away from the intermediate element.

9. The tool for driving out the chain pin according to claim 1, wherein the press-out device slides in a direction of the longitudinal axis of the handle body within the recess between the first position and the second position.

10. The tool for driving out the chain pin according to claim 1, wherein the press-out device is linearly movable relative to the handle body in a direction of the longitudinal axis of the handle body.

11. The tool for driving out the chain pin according to claim 1, wherein the driving screw is linearly movable relative to the handle body in a direction perpendicular to the longitudinal axis of the handle body.

12. The tool for driving out the chain pin according to claim 1, wherein the press-out device is removable attached to the handle body by the guide device.

* * * * *